United States Patent
Luyks

(10) Patent No.: US 9,248,908 B1
(45) Date of Patent: Feb. 2, 2016

(54) HYBRID ELECTRIC POWER HELICOPTER

(71) Applicant: The Boeing Company, Chicago, IL (US)

(72) Inventor: Leo J. Luyks, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 13/916,283

(22) Filed: Jun. 12, 2013

(51) Int. Cl.
*B64C 27/00* (2006.01)
*B64C 27/12* (2006.01)
*B64C 27/52* (2006.01)

(52) U.S. Cl.
CPC ............... *B64C 27/12* (2013.01); *B64C 27/52* (2013.01)

(58) Field of Classification Search
CPC .................................................. B64C 27/12
USPC .............. 244/17.11, 17.23, 17.25, 53 R, 60, 244/17.13, 76 R; 903/903, 905, 906
See application file for complete search history.

(56) References Cited

U.S. PATENT DOCUMENTS

| | | | |
|---|---|---|---|
| 2010/0038473 A1* | 2/2010 | Schneider et al. | 244/60 |
| 2012/0234968 A1* | 9/2012 | Smith | 244/12.3 |
| 2013/0068876 A1* | 3/2013 | Radu | 244/2 |
| 2013/0092789 A1* | 4/2013 | Botti et al. | 244/54 |

\* cited by examiner

*Primary Examiner* — J. Woodrow Eldred
(74) *Attorney, Agent, or Firm* — Joseph M. Rolnicki; Evans & Dixon, L.L.C.

(57) ABSTRACT

A helicopter has a propulsion system that includes a diesel engine driven electric generator, battery storage, power inverters for converting AC current to DC current and converting DC current to AC current, and an electric motor powered main rotor and an electric motor powered tail rotor. The propulsion system is integrated with electric controls of the main rotor electric motor and the tail rotor electric motor to provide additional system efficiencies. The design of the helicopter allows a single engine helicopter to be just as safe as a twin engine design helicopter while consuming less fuel. The helicopter design also includes a main rotor tilt system which tilts the rotation axis of the main rotor forward during high-speed flight to improve the aerodynamic efficiency of the helicopter airframe and rotary wing.

8 Claims, 2 Drawing Sheets

HYBRID ELECTRIC POWER HELICOPTER

FIELD

The present invention pertains to a hybrid diesel/electric powered helicopter. More specifically, the present invention pertains to a helicopter having a propulsion system comprised of a diesel engine driven electric generator, battery storage, power inverters for converting AC current to DC current and converting DC current to AC current, and an electric motor powered main rotor and an electric motor powered tail rotor. The electric propulsion system is integrated with electric controls of the main rotor electric motor and the tail rotor electric motor to provide additional system efficiencies. The design of the helicopter allows a single engine helicopter to be just as safe as a twin engine design helicopter while consuming less fuel. The helicopter design also includes a main rotor tilt system which tilts the rotation axis of the main rotor forward during high-speed flight to improve the aerodynamic efficiency of the helicopter airframe and rotary wing.

BACKGROUND

Conventional rotary wing aircraft or helicopters are powered with either an internal combustion engine or a turbine engine that is coupled to a gear box system which transmits the rotational output of the engine to the main rotor of the aircraft and to the tail rotor of the aircraft. The gear boxes of rotary wing aircraft require regular monitoring and periodic maintenance to ensure their reliable operation. Gear boxes do not have graceful failure modes and if one piece should fail it is likely the entire gear box will fail. Gear boxes are also expensive to manufacture. Additionally, the tail rotor drive transmission of a rotary wing aircraft is complex, especially for helicopters having an air frame with a folding tail for ground storage. These tail rotor drive transmissions also require regular monitoring and periodic maintenance to guard against failures. The main rotor gear box and the tail rotor drive transmission of a rotary wing aircraft also employ hydraulic actuators and gear box driven hydraulic systems to control the main rotor gear box and tail rotor drive transmission. These hydraulic control systems add to the weight of the aircraft and reduce its operation efficiency.

SUMMARY

The inefficiencies of conventional engine driven rotary wing aircraft or helicopters are overcome by the hybrid diesel/electric power rotary wing aircraft of the invention. The novel construction of the hybrid aircraft enhances the fuel efficiency of the aircraft.

The aircraft is provided with a substantially conventional airframe that supports the component parts of the aircraft. A main rotor is mounted to the air frame for rotation of the main rotor relative to the air frame. Additionally, a tail rotor is mounted to the air frame for rotation of the tail rotor relative to the air frame.

The novel features of the aircraft include a main rotor electric motor mounted to the air frame. The main rotor electric motor is operatively connected to the main rotor, whereby running the main rotor electric motor rotates the main rotor of the aircraft.

A tail rotor electric motor is also provided on the airframe of the aircraft. The tail rotor electric motor is operatively connected to the tail rotor, whereby running the tail rotor electric motor rotates the tail rotor of the aircraft.

An electric generator is provided on the airframe of the aircraft. The electric generator is operatively connected to the main rotor electric motor, whereby operating the electric generator supplies electric power from the generator to the main rotor electric motor to run the main rotor electric motor. The electric generator is also operatively connected to the tail rotor electric motor. Operating the electric generator supplies electric power from the generator to the tail rotor electric motor to run the tail rotor electric motor.

A combustion engine is provided on the airframe of the aircraft. The combustion engine is operatively connected to the generator, whereby running the combustion engine operates the generator.

One or more batteries are provided on the air frame of the aircraft. At least one battery is operatively connected with the generator to receive electric power from the operating generator which charges the battery. The battery is also operatively connected to the main rotor electric motor to supply power to the main rotor electric motor, and to the tail rotor electric motor to supply power to the tail rotor electric motor.

A plurality of electric current inverters are provided on the air frame of the aircraft. An inverter of the plurality is operatively connected to the electric generator and is also operatively connected to the battery. The inverter converts alternating electric current created by the generator to direct electric current and supplies the direct electric current to the battery to charge the battery.

A second electric current inverter of the plurality of electric current inverters is also provided on the air frame of the aircraft. The second electric current inverter is operatively connected to the battery and is also operatively connected to the main rotor electric motor. The second inverter receives direct electric current supplied by the battery and converts the direct electric current to alternating electric current. The alternating electric current is supplied by the inverter to the main rotor electric motor to run the motor.

A main rotor tilt actuator is also provided on the air frame of the aircraft. The tilt actuator is operatively connected to the main rotor to selectively tilt the main rotor forward during high-speed flight to improve the aerodynamic efficiency of the air frame and the rotary wing.

A flight control system is provided on the air frame of the aircraft. The flight control system communicates with the main rotor electric motor, the tail rotor electric motor, the electric generator, a controller of the internal combustion engine, the electric current inverters and the rotor tilt actuator and provides control signals from an operator of the aircraft to these components of the aircraft.

The enhanced fuel efficiency rotary wing aircraft described above reduces the fuel consumption of the aircraft by as much as 50% of that of a conventional rotary wing aircraft of substantially the same configuration, lowers the weight of the aircraft or gross takeoff weight by eliminating gear boxes, drive transmissions, and hydraulic control systems. Reducing fuel storage needs of the aircraft lowers the carbon footprint of the aircraft by reducing engine specific fuel consumption. The acoustics of the aircraft are lowered from that of a standard engine powered helicopter by take off and landing under electric power. The features, functions, and advantages that have been discussed can be achieved independently in various embodiments or may be combined in other embodiments further details of which can be seen with reference to the following description and drawings.

DESCRIPTION

Figure 1:
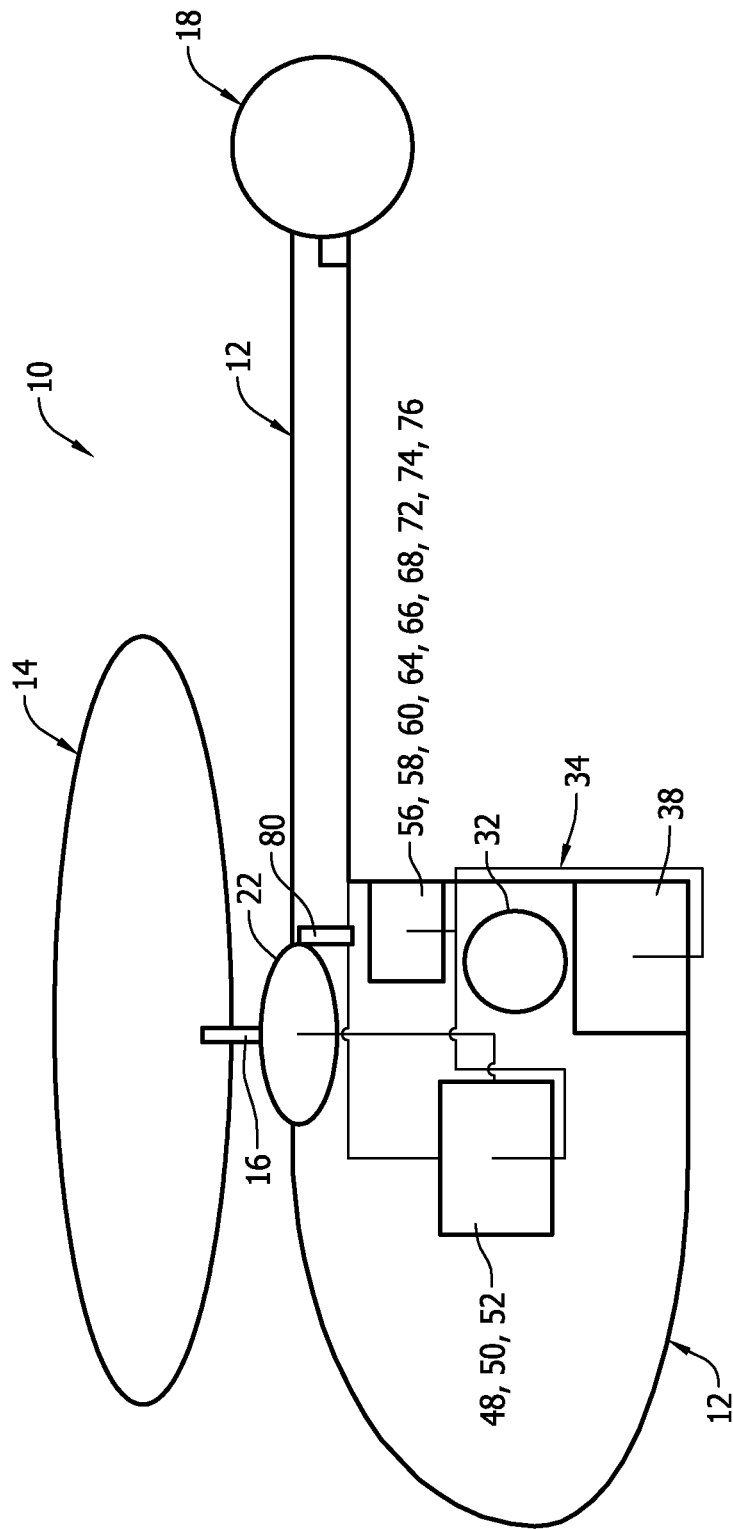
FIG. 1 is a schematic representation of the enhanced fuel efficiency rotary wing aircraft.

FIG. 1 is a schematic representation of the hybrid diesel/electric power rotary wing aircraft 10 of the invention. The hybrid diesel/electric helicopter is an advanced version of a conventional helicopter platform. The design inherently allows a single engine helicopter to be just as safe as a twin-engine helicopter at lower cost and higher fuel efficiency. The following technologies have matured to make this design possible: modern light weight turbocharged diesel engines with electronic fuel controls, efficient high power electrical switching devices (IGBTs), digital commutation controls (IWMC), lightweight high power density lithium ion batteries, carbon fiber structures (advanced rotor blades which allow variable rpm), and efficient brushless dc motors (ring motors). The aircraft 10 has a substantially conventional airframe 12 that supports the component parts of the aircraft.

Figure 2:
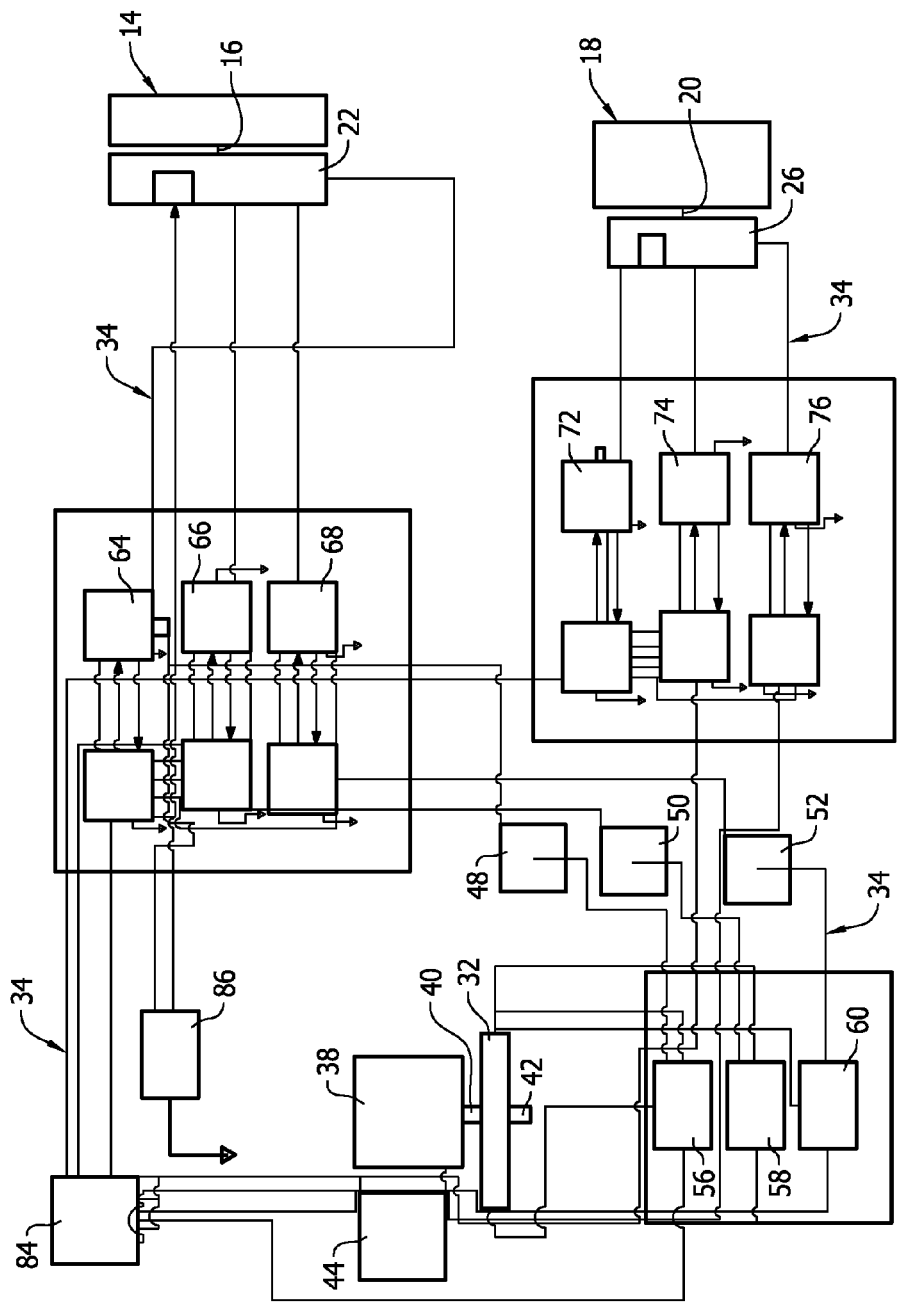
FIG. 2 is a schematic representation of the hybrid system block diagram of the enhanced fuel efficiency rotary wing aircraft.

A main rotor is mounted to the airframe 12 for rotation of the main rotor relative to the airframe. It is a conventional single main rotor system, multiple blade rotor. The main rotor is comprised of a plurality of rotor blades 14 that are mounted to a rotor shaft 16 as represented schematically in FIGS. 1 and 2. The rotor shaft 16 is mounted to the airframe 12 for rotation of the shaft 16 and the rotor blades 14 relative to the airframe 12.

A tail rotor 18 is also mounted to the airframe 12 for rotation of the tail rotor relative to the airframe. The tail rotor 18 is comprised of a plurality of tail rotor blades and a tail rotor shaft 20 represented schematically in FIGS. 1 and 2.

The novel features of the aircraft 10 include a main rotor electric motor 22 mounted to the airframe 12. The main rotor electric motor 22 is operatively connected to the main rotor shaft 16. Running the main rotor electric motor 22 rotates the rotor shaft 16 and the rotor blades 14 of the main rotor of the aircraft. In the preferred embodiment of the aircraft, the main rotor electric motor 22 is connected directly to the main rotor shaft 16, meaning that there are no intervening gear boxes or equivalent devices between the main rotor electric motor 22 and the main rotor shaft 16. This eliminates the need for a main gear box. The ratio of rotations of the main rotor electric motor output shaft and the blades of the main rotor 14 is 1 to 1. A rigid rotor design allows for variable rotor speed without the inherent vibration problem associated with articulated rotors.

A tail rotor electric motor 26 is also mounted to the airframe 12 of the aircraft. The tail rotor electric motor 26 is operatively connected to the tail rotor 18. Running the tail rotor electric motor 26 rotates the tail rotor 18 of the aircraft 10. In the preferred embodiment of the aircraft the tail rotor electric motor 26 is directly connected to the tail rotor 18, meaning that there are no intervening gear boxes or other equivalent devices between the tail rotor electric motor 26 and the tail rotor 18. The ratio of the rotations of the tail rotor electric motor output shaft and the blades of the tail rotor 18 is 1 to 1. The tail rotor 18 is a conventional tail fan design with single motor rotation direction and collective control of tail rotor blade pitch via redundant electric linear actuators.

An electric generator 32 is mounted to the airframe 12 of the aircraft. The generator 32 is an interleaved generator with three phases. The generator phases are isolated and inverted by separate inverters yet to be described to allow for electric power generation redundancy. The electric generator 32 is operatively, electrically connected to the main rotor electric motor 22. Operating the electric generator 32 or rotating the rotor of the electric generator generates power that is supplied from the generator through an electrical network 34 of the aircraft represented in FIG. 2 to the main rotor electric motor 22 to run the main rotor electric motor. The electric generator 32 is also operatively, electrically connected to the tail rotor electric motor 26 through the electrical network 32. Operating the electric generator 32 or rotating the rotor of the generator produces electric power that is supplied through network 34 to the tail rotor electric motor 26 to run the tail rotor electric motor.

A combustion engine 38 is mounted to the airframe 12 of the aircraft 10. The combustion engine 38 is operatively connected to the generator 32. Running the combustion engine 38 rotates the rotor of the generator 32 and operates the generator. In the preferred embodiment of the aircraft 10 the combustion engine 38 is a lightweight turbocharged diesel engine. The diesel engine 38 allows fuel compatibility with existing aviation systems. Turbo charging is employed to provide forced induction and resulting performance gains. The engine 38 and generator 32 are optimized to operate in the 2000 rpm range. The hybrid system allows for the lighter diesel engine 38, and peak loads can be handled from the battery system to be described. For the hybrid system, a typical flight would take off at idle using battery power, then ramp up power with the diesel engine to recharge the batteries, then reduce to cruise, then back to idle to land under battery power. The turbocharged diesel provides low specific fuel consumption at a wide range of power, altitude, and rpm settings consistent with aircraft operating over a wide range of mission takeoffs, loiter, surge, etc. Existing turboshaft engines have a specific fuel consumption rating of 0.8 while advanced turbocharged diesel engines have a rating of 0.3 to 0.34. A significant portion of a helicopter gross weight is fuel. The fuel savings of the proposed diesel/electric design will benefit the helicopter design allowing lighter structure and reduced fuel tankage to offset the required volume for the battery system to be described. Engine cooling is provided by a conventional radiator system with an electric fan forced air system. The electric fan allows for further efficiencies as the fan motor can be shut down during cruise or at high altitude when not needed to maintain engine temperature. The combustion engine 38 includes an electronic engine controller 44. The electronic engine controller 44 adjusts the speed of the rotation of the combustion engine output shaft 40 in response to electrical signals received by the controller. In the preferred embodiment of the aircraft 10, an output shaft 40 of the combustion engine 38 is directly connected to a rotor shaft 42 of the generator 32. By being directly connected what is meant is that the engine output shaft 40 is directly connected to the generator rotor shaft 42 with there being no intervening gear boxes or other equivalent devices. The ratio of the rotation of the engine output shaft 40 and the generator rotor shaft 42 is 1 to 1.

A plurality of batteries 48, 50, 52 are mounted to the airframe 12 of the aircraft 10. The batteries 48, 50, 52 are operatively, electrically connected with the electric generator 32 to receive electric power from the operating generator which charges the batteries. The batteries 48, 50, 52 are also operatively, electrically connected to the main rotor electric motor 22 to supply power to the main rotor electric motor, and to the tail rotor electric motor 26 to supply power to the tail rotor electric motor. In the preferred embodiment of the aircraft 10, there are three batteries 48, 50, 52 mounted to the airframe 12 of the aircraft. The three batteries 48, 50, 52 provide redundancy to the hybrid propulsion system of the aircraft 10. Additionally, in the preferred embodiment of the aircraft 10 the three batteries 48, 50, 52 are each high energy density lithium ion batteries. The batteries 48, 50, 52 also provide backup power in the event of a diesel engine failure and are sized to provide sufficient energy for a take off followed by abort to landing. The batteries operate at the 270V range. Battery charge control and over voltage protection is managed by generator inverters to be described.

Three separate, isolated power busses operating in the 270V range are provided for redundancy in distribution of the generated power to the rotor drive motors 22, 26. Multiple inverters drive the motors 22, 26 using a motor phase interleave technique to provide electrical redundancy and inverter power density efficiency. The integrated motor and inverter combination is fault tolerant to electrical failures. The generator 32 output is commutated, conditioned and controlled by the inverters.

A plurality of first electric current inverters 56, 58, 60 are mounted to the airframe 12 of the aircraft 10. Each of the first inverters 56, 58, 60 is operatively, electrically connected to the electric generator 32 through the electric network 34 and each of the first inverters 56, 58, 60 is operatively, electrically connected to the respective batteries 48, 50, 52 through the network 34. Each of the inverters 56, 58, 60 includes a microcontroller unit and converts alternating electric current created by the electric generator 32 to direct electric current and supplies the direct electric current to the respective batteries 48, 50, 52 to charge the batteries.

A plurality of second electric current inverters 64, 66, 68 is also provided on the airframe 12 of the aircraft 10. Each of the second inverters 64, 66, 68 is operatively, electrically connected to a respective battery 48, 50, 52 through the electrical network 34 and is also operatively, electrically connected to the main rotor electric motor 22 through the electric network 34. Each of the second inverters 64, 66, 68 includes a microcontroller and receives direct electric current supplied by a respective battery 48, 50, 52 and converts the direct electric current to alternating electric current. The alternating electric current is supplied by each of the second inverters 64, 66, 68 to the main rotor electric motor as one phase of a three phase system. The three phases of the alternating current supplied by the second inverters 64, 66, 68 to the main rotor electric motor 22 run the motor. The inverter control can vary the rpm of the main rotor electric motor to allow operation of the rotor system at the most efficient operating point for a given flight regime and aircraft weight over time.

A plurality of third electric current inverters 72, 74, 76 is also provided on the airframe 12 of the aircraft 10. Each of the third electric current inverters 72, 74, 76 is operatively, electrically connected to a respective battery 48, 50, 52 through the electric network 34 and is also operatively, electrically connected to the tail rotor electric motor 26. Each of the third inverters 72, 74, 76 includes a microcontroller and receives direct electric current supplied by a respective battery 48, 50, 52 and converts the direct electric current to alternating electric current. The alternating electric current is supplied by each of the third inverters 72, 74, 76 as one phase of a three phase system. The three phases of alternating current are supplied to the tail rotor electric motor to run the motor.

A main rotor tilt actuator 80 is also provided on the airframe 12 of the aircraft 10. The tilt actuator is operatively, mechanically connected to the main rotor electric motor 22 to selectively tilt the main rotor electric motor 22 and the main rotor shaft 16 forward during high speed flight of the aircraft 10 to improve the aerodynamic efficiency of the airframe 12 and the main rotor blades 14.

A flight control system 84 is provided on the airframe 12 of the aircraft 10. The flight control system communicates through the electrical network 34 with the main rotor electric motor 22, the tail rotor electric motor 26, the electric generator 32, the electronic engine controller 44, the electric current inverters 56, 58, 60, 64, 66, 68, 72, 74, 76 and the main rotor tilt actuator 80 and provides control signals from an operator of the aircraft 10 through the electric network 34 to these components of the aircraft. The flight controls 84 include hardware and software that integrate the generator 32 with control laws pertaining to diesel engine 38 power settings based on system demand and the current operating environment measurements (ambient temperature, altitude, electrical demand, diesel engine temperature and thresholds). The design operates the diesel engine 38 at maximum engine efficiency at any aircraft speed. The hybrid controller logic would automatically vary the diesel engine 38 and rotor motor 22 performance parameters based on takeoff weight, flight conditions, performance settings, etc. Additional efficiencies are gained because the main rotor 14 requires faster rpm in high speed flight and can turn slower in hovering or low speed flight to conserve power.

The electric propulsion is integrated with electro-mechanical actuators mounted on the main rotor electric motor 22 and tail rotor electric motor 26 to provide additional system efficiencies over conventional helicopters which use hydraulic actuators and a gear box driven hydraulic pump system. The all electric tail rotor design facilitates a folding tail system to aid in aircraft storage on the ground.

The electronic network 34 of the aircraft is also provided with a backup power connection 86. When the aircraft is idle, the backup power connection 86 can be connected to a separate source of 24 volt electric power to charge the batteries 48, 50, 52 as the aircraft is idle.

The enhanced fuel efficiency rotary wing aircraft 10 described above reduces the fuel consumption of the aircraft by as much as fifty percent of that of a conventional rotary wing aircraft of substantially the same configuration. The aircraft lowers the gross takeoff weight by eliminating gear boxes and drive transmissions, and by eliminating hydraulic control systems for the gear boxes and transmissions as well as other operative surfaces of a conventional rotary wing aircraft. Reducing fuel storage needs also reduces the weight of the aircraft and lowers the carbon footprint of the aircraft by reducing engine specific fuel consumption. The acoustics of the aircraft on take off and landing are also lowered by use of electric power.

Although the hybrid diesel/electric power aircraft has been described above by reference to a specific embodiment, it should be understood that modifications and variations could be made to the aircraft described without departing from the intended scope of the claims appended hereto and their equivalents.

The invention claimed is:

1. A method to enhance fuel efficiency of a rotary wing aircraft, the method comprising:
providing the aircraft with a main rotor electric motor and operatively connecting the main rotor electric motor to a main rotor of the aircraft, whereby running the main rotor electric motor rotates the main rotor of the aircraft;
providing the aircraft with an engine;
providing the aircraft with a generator, operatively connecting the generator to the engine and operatively connecting the generator to the main rotor electric motor, whereby running the engine in turn operates the generator and the operating generator supplies electric power to the main rotor electric motor to run the main rotor electric motor and rotate the main rotor;

providing the aircraft with a battery, operatively connecting the battery to the generator and operatively connecting the battery to the main rotor electric motor;

providing the aircraft with a flight control system, the flight control system controlling the engine to run at idle during takeoff and the flight control system controlling the main rotor electric motor to use battery power to power the takoff of the aircraft;

following takeoff of the aircraft, the flight control system controlling the engine to increase speed above idle and operate the generator to recharge the battery during flight of the aircraft; and, the flight control system controlling the engine to return to idle and the flight control system controlling the main rotor electric motor to use battery power to land the aircraft.

2. The method of claim 1, further comprising:

providing the aircraft with a tail rotor electric motor and operatively connecting the tail rotor electric motor to a tail rotor of the aircraft, whereby running the tail rotor electric motor rotates the tail rotor of the aircraft; and, operatively connecting the generator to the tail rotor electric motor, whereby the operating generator supplies electric power to the tail rotor electric motor to run the tail rotor electric motor and rotate the tail rotor.

3. The method of claim 1, further comprising:

directly connecting the main rotor electric motor to the main rotor of the aircraft.

4. The method of claim 2, further comprising:

directly connecting the tail rotor electric motor to the tail rotor of the aircraft.

5. The method of claim 1, further comprising:

directly connecting the engine to the generator.

6. The method of claim 1, further comprising:

operatively connecting the battery to the tail rotor electric motor.

7. The method of claim 1, further comprising:

providing the aircraft with an inverter, operatively connecting the inverter with the generator and operatively connecting the inverter with the battery.

8. The method of claim 6, further comprising:

providing the aircraft with a second inverter, operatively connecting the second inverter to the battery and operatively connecting the second inverter to the main rotor electric motor.

\* \* \* \* \*